United States Patent [19]

Yagasaki et al.

[11] Patent Number: 5,510,906
[45] Date of Patent: Apr. 23, 1996

[54] MOTION PICTURE RECORDING METHOD, MOTION PICTURE RECORDING MEDIUM, AND MOTION PICTURE REPRODUCING APPARATUS

[75] Inventors: Yoichi Yagasaki; Hideki Koyanagi, both of Kanagawa, Japan

[73] Assignee: Sony Corporation, Japan

[21] Appl. No.: 384,369

[22] Filed: Feb. 2, 1995

Related U.S. Application Data

[63] Continuation of Ser. No. 109,089, Aug. 19, 1993, abandoned.

[30] Foreign Application Priority Data

Aug. 31, 1992 [JP] Japan .................................. 4-255517

[51] Int. Cl.⁶ ...................................................... H04N 5/76
[52] U.S. Cl. .............................................. 358/342; 358/907
[58] Field of Search ...................................... 358/342, 335, 358/310, 322, 312, 338, 907; 369/39, 44.28

[56] References Cited

U.S. PATENT DOCUMENTS 5,140,437  8/1992  Yonemitsu et al. .................... 358/342
5,255,102 10/1993  Fushiki ................................... 358/342

Primary Examiner—Tommy P. Chin
Assistant Examiner—Robert Chevalier
Attorney, Agent, or Firm—Limbach & Limbach; Charles P. Sammut

[57] ABSTRACT

In a motion picture recording method, a motion picture recording medium, and a motion picture reproducing apparatus, picture data composed of a plurality of motion pictures is recorded to be time-successively reproduced. The picture data, composed of a plurality of motion pictures, is recorded on a disc recording medium on a spiral recording track on which every motion picture is separately recorded, track unit by track unit, in order. Further, respective picture data is recorded to overlap in the radial direction corresponding to at least the time needed for a one-track-jump. Therefore, a motion picture recording method, a motion picture recording medium, and a motion picture reproducing apparatus are realized, which allow the reproducing state to be switched to the reproducing of the picture data of another motion picture by track-jump, when the picture data of one motion picture is reproduced from the picture data of a plurality of motion pictures, so as to time-successively reproduce between a plurality of motion pictures.

4 Claims, 3 Drawing Sheets

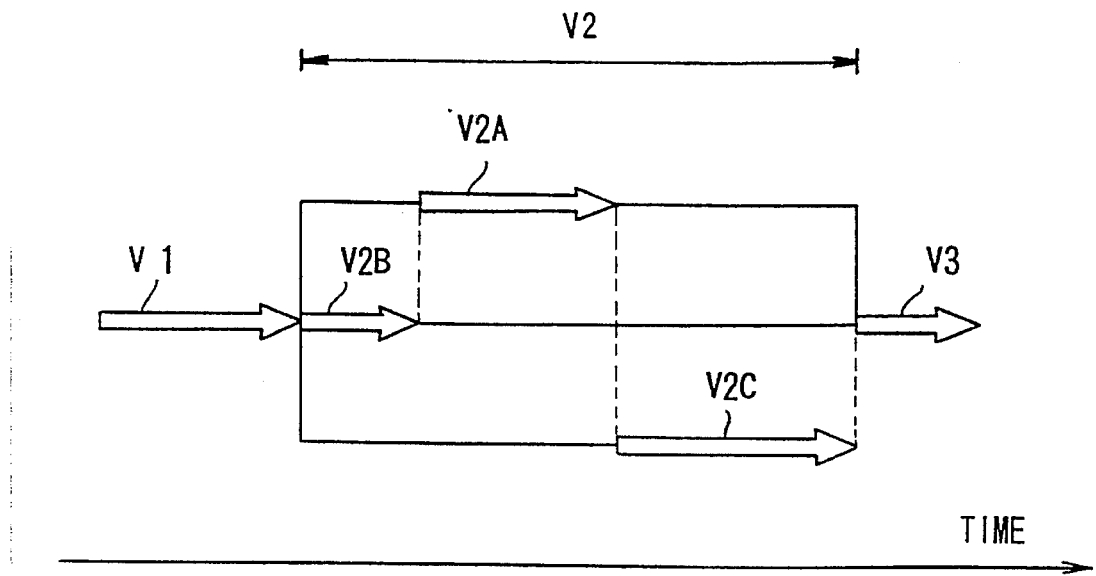
FIG. 2
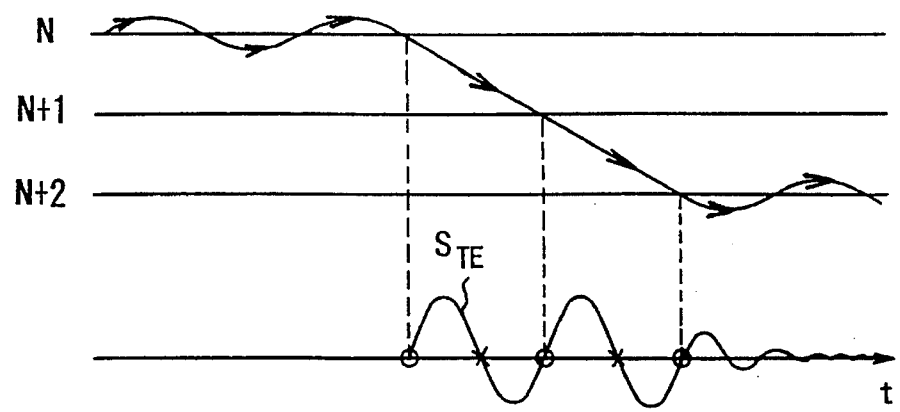
FIG. 3A
FIG. 3B

MOTION PICTURE RECORDING METHOD, MOTION PICTURE RECORDING MEDIUM, AND MOTION PICTURE REPRODUCING APPARATUS

This is a continuation of application Ser. No. 08/109,089 filed on Aug. 19, 1993 now abandoned.

BACKGROUND OF THE INVENTION

1. Field of the Invention

This invention relates to a motion picture recording method, a motion picture recording medium, and a motion picture reproducing apparatus, and is suitable for application to the case where picture data composed of a plurality of motion pictures is recorded on art optical disc, and then is reproduced.

2. Description of the Related Art

It is posited that, for example, scenes of a sports event, a concert or the like are taken by a plurality of video cameras, and the plurality of motion pictures thus obtained simultaneously are also recorded on an optical disc. During reproduction, the recorded optical disc is reproduced selectively, such that either a single motion picture taken by a predetermined video camera or a plurality of motion pictures is displayed. By such a display method, the user can enjoy a motion picture which is edited as desired. This differs from the conventional method in which a motion picture formed with previous editing is displayed.

Such a display method is realized by improvement of the compression encoding techniques for motion pictures, by which about five times as much motion picture data can be written on an optical disc which is the same size as a conventional one. This means that, even for the same reproducing time, a plurality of motion pictures taken by five video cameras can be recorded.

On the other hand, the track pattern of ordinary optical discs has been formed in a spiral, not in concentric circles, because in ordinary use, successive reproduction of one motion picture is most common.

When a plurality of motion pictures is recorded to such an ordinary optical disc, it is considered that each motion picture is recorded to each area at once. For example, when there are motion picture data a, b, . . . , e, taken by video cameras A, B, . . . , E, each motion picture data is sequentially disposed in the radial direction from the center of the optical disc.

By disposing data in such a manner, in ordinary reproduction in which the motion picture data taken by only one video camera is displayed, the optical pick-up may move ordinarily in a successive fashion.

While reproducing a predetermined motion picture (for example, the motion picture data a), if switching to reproduce another motion picture (for example, the motion picture data b), the recording position of the picture data of the motion picture b which corresponds to the recording position of the picture data of the motion picture a is obtained. The optical pick-up is track-jumped from the current position to the obtained recording position (within motion picture b), and then is switched to the reproducing state so as to display motion picture b.

However, as described above, in the case of an optical disc on which the picture data of a plurality of motion pictures are separately recorded to respective areas, at the time of switching from the recording area of a predetermined motion picture data to the other, the optical pick-up must obtain the recording position corresponding to the second picture data so as to track-jump. This occurs when these motion picture data are accessed one after another in order to be reproduced.

In this case, since the optical pick-up must cross completely the other recording area, the moving distance of the optical pick-up becomes longer.

Therefore, time elapses before reproduction of the other motion picture data begins. Thus, there: is the problem that it cannot time-successively reproduce from among a plurality of motion pictures.

Further, the calculation for obtaining the corresponding recording position is complicated. Thus, there is the problem that control of the reproducing apparatus becomes complicated.

Furthermore, because the moving distance of the optical pick-up is large and high speed track-jumping is required, a drive mechanism having a powerful optical pick-up is required.

SUMMARY OF THE INVENTION

In view of the foregoing, an object of this invention is to provide a motion picture recording method, a motion picture recording medium, and a motion picture reproducing apparatus for time-successively reproducing a plurality of motion pictures using a recording medium recorded with picture data of a plurality of motion pictures.

The foregoing object and other objects of the invention have been achieved by the provision of a motion picture recording method in which picture data A1, A2, A3 . . . (AN), B1, B2, B3 . . . (BN), and C1, C2, C3 . . . (CN), which respectively correspond to a plurality of motion pictures A, B and C. The motion pictures A, B and C are recorded on a spiral recording track TR of a disc recording medium 1. The picture data AN, BN, and CN, corresponding to each motion picture A, B, and C, are separately and alternately recorded on every recording track unit in order (i.e. the order of the picture data runs, for example A1, B1, C1, A2, B2, C2, A3 . . . as shown in FIG. 1B).

Moreover, each respective picture data AN, BN, and CN is recorded so as to overlap itself by a predetermined distance in the radial direction of the disc recording medium.

Further, in this invention, the end of an N-th picture data (for example AN), is time-continuous with the picture data as at the start of the N+1th picture data (for example AN+1) located elsewhere on the recording track TR.

Further, in this invention, the picture data AN, recorded on one recording track unit, is recorded to overlap with the picture data BN and CN, recorded on other recording track units of the disc recording medium 1. ΔT is the distance corresponding to the time needed for a single track-jump (also called a one-track-jump) in reproduction.

Further, in this invention, the picture data AN, BN, and CN, corresponding to respective motion pictures A, B, and C, are separately and alternately recorded on successive recording track units in order. These respective picture data AN, BN, and CN are recorded to overlap in the radial direction.

Further, in this invention, the start and the end of the picture data AN, of motion picture A, corresponds to the same start and end times of the picture data BN and CN, of motion pictures B and C respectively.

Further, in this invention, the picture data AN, recorded on a recording track unit, is recorded to overlap with the picture data BN and CN, recorded on other recording track units, in the radial direction (as shown in FIG. 1B). As shown in FIG. 1B, distances ΔT and 2ΔT can be used in determining the extent of the overlap between recording track units. ΔT and 2ΔT correspond to time needed for track-jump in reproduction.

Further, the motion picture reproducing apparatus 10 (see FIG. 4) plays back the disc recording medium 1 on which has been recorded the picture data AN, BN, and CN corresponding to a plurality of motion pictures A, B, and C. When one of the motion pictures (for example, motion picture A) is to be continuously reproduced, at the time of track-jump, the picture data (for example AN) on the recording track unit before track-jump is reproduced during track access, and after completing track-jump, the picture data (for example AN+1) on a subsequent recording track unit is then reproduced.

Furthermore, in this invention, the picture data AN, BN, and CN before or after track-jump are successively reproduced with synchronization to the video signal.

Picture data A1, A2, A3 ... (AN), B1, B2, B3 ... (BN), and C1, C2, C3 ... (CN), composed of a plurality of motion pictures A, B, and C, are recorded on a disc recording medium 1. Picture data AN, BN, and CN are recorded separately on successive recording track units, track unit by track unit in respective order. Picture data composing motion pictures A, B and C are recorded in order with respect to motion pictures A, B, and C. For example, the order of recorded picture data runs A1, B1, C1, A2, B2, C2, A3 ... as shown in FIG. 1B. Each respective picture data AN, BN and CN is recorded to overlap itself in the radial direction at least by ΔT needed for one recording track-jump. When reproducing either the picture data AN, BN, or CN of a single motion picture A, B, or C, or the picture data AN, BN, and CN of a plurality of motion pictures A, B, and C, switching between the reproduction of picture data AN, BN, and CN is achieved by track-jumping. Thus, reproduction occurs time-continuously between a plurality of motion pictures A, B, and C.

The nature, principle, and utility of this invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 2 is a timing chart explaining the picture data which is composed of a plurality of motion pictures recorded on the optical disc of FIGS. 1A and 1B;

FIGS. 3A and 3B are signal waveform diagrams explaining the track-jump control method of the optical disc of FIGS. 1A and 1B.

DETAILED DESCRIPTION OF THE INVENTION

Figure 1A:
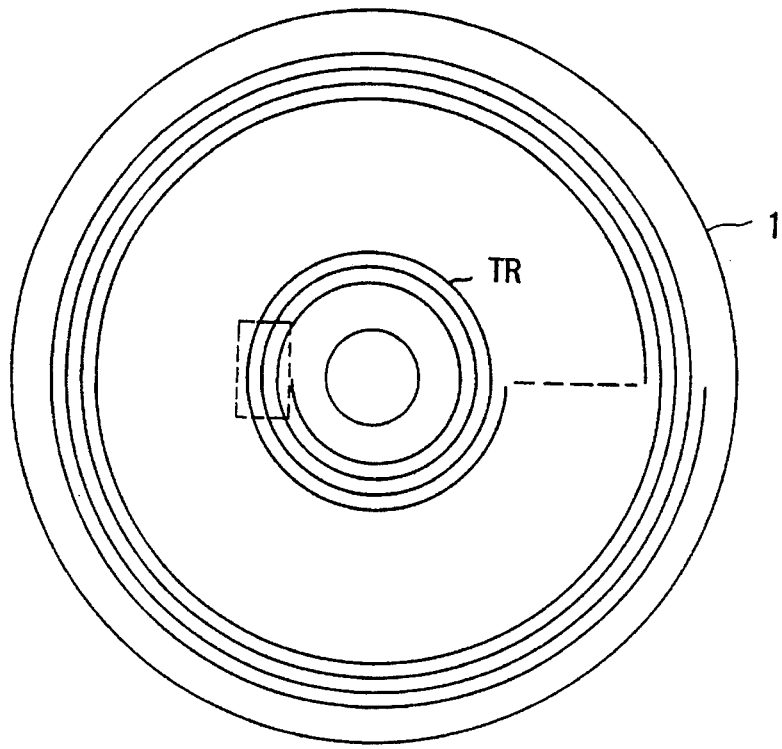
FIGS. 1A and 1B are schematic plan diagrams showing an embodiment of an optical disc to which is applied a motion picture recording method according to this invention.

Preferred embodiments of this invention will be described with reference to the accompanying drawings:

In FIG. 1A, 1 generally denotes an optical disc according to this invention.

A compact disc (CD) made from carbonate, a laser disc (LD), or the like, can be used in place of the optical disc 1.

On the optical disc 1, a recording track TR constructed with pits which constitute digital data is formed spirally.

Figure 1B:
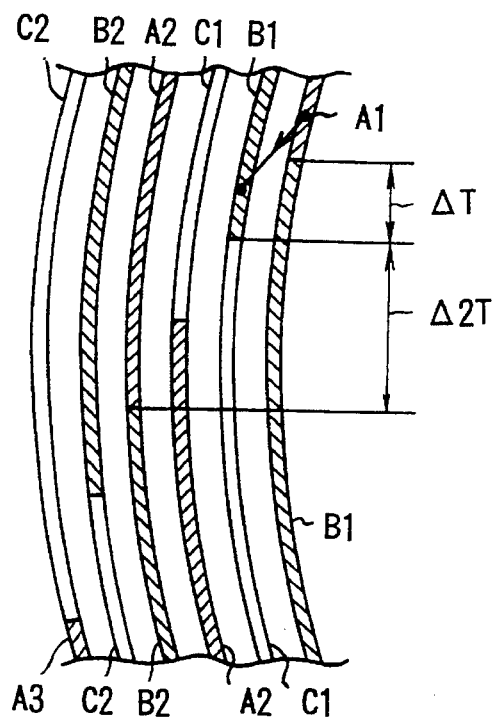

FIG. 1B is an enlarged view of a section of the disc shown in FIG. 1A.

In the optical disc 1, picture data A1, A2, A3 ... (AN), B1, B2, B3 ... (BN), and C1, C2, C3 (CN) of a plurality of motion pictures A, B, and C, are respectively and separately recorded on recording track units measured along the spiral recording track TR.

On this optical disc 1, the start and the end of a picture data (B1, for example) is recorded to overlap itself in the radial direction for at least ΔT corresponding to the time needed for the track-jumping of one recording track unit. In this way, the recorded respective picture data AN, BN and CN has a construction which takes into account the time necessary to perform track-jumps which occur when reproducing the data of one or of the motion pictures A, B and C.

Here, when switching from the picture data A1 to the picture data B1, it takes the time for a one-track-jump which corresponds to ΔT as shown in FIG. 1B. That is, when track-jumping from the point on the picture data A1 (shown in FIG. 1B) to a corresponding point on the picture data B1 (shown in FIG. 1B), it takes the time, corresponding to ΔT, to complete the track-jump. Therefore, when reproducing the picture data A1, if one selects the picture data B1 corresponding to it, the motion picture can be successively reproduced while maintaining its continuity. Thus, a troublesome calculation becomes unnecessary, since the position to be track-jumped is practically determined without calculating the track-jump destination position. Additionally, when switching from the picture data B1 to the picture data C1, the time needed for one-track-jump, corresponding to ΔT, is maintained similarly.

Accordingly, when switching from the picture data A1 to a the picture data C1, the time needed for two-track-jumps, corresponding to 2ΔT, becomes necessary.

As described above, for displaying different and adjacent picture data, a one-track-jump is necessary. It is also necessary to provide for the overlap, shown by ΔT in FIG. 1B, needed for one-track-jump in the radial direction. If there is a plurality (N) of picture data, however, the reproducing apparatus should be capable of multiple-track-jumps, up to the maximum of N-1-track-jumps.

In normal reproduction, when switching from the picture data B1 to the picture data B2, the time needed for two-track-jumps, corresponding to 2ΔT, is maintained. Accordingly, when reaching the end of the picture data B1, it jumps two tracks to the start of the picture data B2, in order to reproduce the picture data B2 consecutively and with continuity. Further, when switching from the picture data B2 to the picture data B3, there is a similar two-track-jump to get from the end of picture data B2 to the beginning of picture data B3 (as shown in FIG. 1B).

Thereby, when only the picture data BN (shown in FIG. 1B) is successively reproduced, there are always two-track-jumps between reproduction of consecutive picture data. With the above relationship, if there is a plurality of picture data, for example, there are N picture data, an N-1-track-jump is always repeated after reading the data of one recording track unit.

According to the above recording method, the picture data AN, BN, and CN can be time-successively reproduced between a plurality of motion pictures A, B, and C.

Here, there is a problem with respect to both the time needed for track-jumping and its precision.

First, the time needed for a track-jump is several hundred microseconds [μsec]. It is short in comparison with 33 milliseconds [msec], which is the time necessary for one frame of the picture data AN, BN, and CN taken at 30 frames/second. Therefore, picture data can be time-successively reproduced with no problem.

The case where a plurality of motion pictures corresponding to the same time are recorded on the optical disc 1 will be described in detail.

FIG. 2 shows the structure of the motion pictures of scenes of a sports event, a concert or the like, recorded on the optical disc. V1 and V3 indicate motion pictures taken by the same camera, and V2A, V2B, V2C indicate motion pictures A, B, and C taken, respectively, by a plurality of cameras. In this case, as shown in FIG. 2, it is required to switch from the motion picture V2B to V2A, from V2A to V2C, and from V2C to V3 while time-successively reproducing.

The white arrow portions show the motion pictures reproduced and displayed during switching.

As shown in this example, only particular parts from among a plurality of motion pictures can be recorded, rather than recording a plurality of complete motion pictures on the optical disc.

Figure 4:
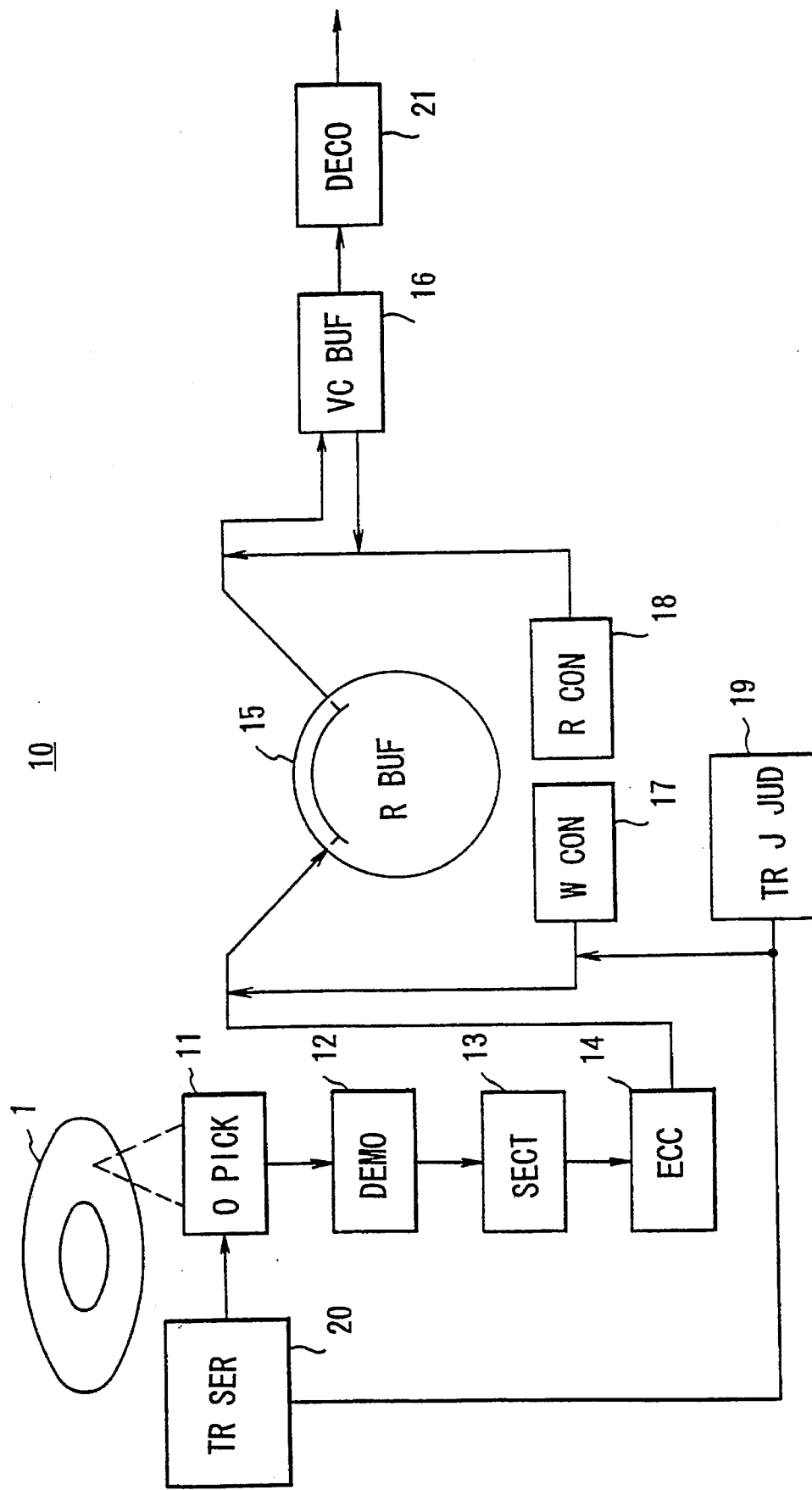
FIG. 4 is a block diagram showing an optical disc reproducing apparatus for reproducing the picture data of the optical disc of FIGS. 1A and 1B.

FIG. 4 shows an example of an optical disc reproducing apparatus which is suitable for reproduction of the optical disc according to the method of the present invention. This kind of optical disc reproducing apparatus has been described in detail in U.S. patent application Ser. No. 07/908164 (filed Jul. 2, 1992), corresponding to the European Patent Application which was laid-open as Publication No. 522853, on Jan. 13, 1993. So, this invention will be described only with respect to the principal parts.

That is, the optical disc 1 has recorded upon it the picture data AN, BN, and CN of a plurality of motion pictures A, B, and C, and is read by an optical pick-up 11.

Picture data read by the pick-up 11 is demodulated by a demodulator 12, and then every sector is blocked by a sectorizing circuit 13, and errors are corrected by an error checking and correcting (ECC) circuit 14. Continuously, it is written instantly to a ring buffer memory 15 composed of, for example, dual port RAM, and then it is read-out to a video code buffer 16.

The write-to and the read-out addresses of the ring buffer 15 are generated from a writing control circuit 17 and a reading control circuit 18, respectively. The writing control circuit 17 controls the timing to write according to the track-jump information obtained from a track-jump judging circuit 19.

The reading control circuit 18 controls the timing to read according to the data quantity information inputted from the video buffer 16.

The track-jump information obtained from the track-jump judging circuit 19 is supplied to a tracking servo circuit 20, in order to control the track-jump. In practice, the distance needed for track-jumping of the recording track TR, i e., the number of recording tracks TR, can be controlled with high precision by using an error signal of the tracking servo.

FIG. 3A shows the typical scanning path of the optical pick-up on the recording track TR. When the optical pick-up track-jumps from the N-th recording track TR to the N+2-the recording track TR, certain of the intersecting points of the error signal $S_{TE}$ of the tracking servo (shown in FIG. 3B with circles) are sequentially counted. The optical pick-up thereby track-jumps with high precision to the N+2-th recording track TR, jumping a distance of two recording tracks.

Here, when the picture data AN, BN, and CN, corresponding to motion pictures A, B and C, are recorded on the optical disc 1 according to such a recording method, the data size of respective frames is constant. Also, the data size of each corresponding frame of the respective motion pictures A, B and C is constant, since the data size of each corresponding frame is constant.

In this manner, the start position of a corresponding frame is shifted along the recording track TR by a distance corresponding to the time needed for a track-jump, or $\Delta T$ (as shown in FIG. 1B).

Therefore, even if jumping from any frame from one motion picture to a frame of another motion picture, the frame of the following time can be read. That is, even if track-jumping at an arbitrary position, the picture data AN, BN, and CN can be time-successively reproduced.

Likewise,, when the data size of the respective frames is variable, or the data size of each corresponding frame of the respective motion pictures A, B, and C is variable (because the data size of each corresponding frame is variable), the start position each corresponding frames is shifted along the recording track TR.

Therefore, after jumping to another recording track TR, the frame of the following next time can be read. That is, even when track-jumping from an arbitrary position on the recording track TR, the picture data AN, BN and CN can be reproduced time-successively.

The picture data AN, BN and CN, reproduced and stored in the video code buffer 16 in this manner, are inputted to a decoder 21 in synchronization with the video signal. In the decoder 21, the picture data AN, BN and CN are decoded according to a method of high efficiency encoding which entails an orthogonal conversion, variable length encoding and/or a motion adaptive encoding etc.

According to the above construction, when a plurality of motion picture data is recorded on a recording track on the optical disc, the picture data of respective motion pictures are separately recorded, track unit by track unit, in order.

Further, the each respective picture data (i.e. respective track unit) is recorded to overlap itself in the radial direction corresponding to at least the time needed for a one-track-jump.

Thereby, when the picture data of one motion picture is reproduced from the picture data AN, BN and CN of a plurality of motion pictures A, B and C, it is possible to switch to reproducing the picture data of another motion picture by track-jumping. Thereby, an optical disc recording method, an optical disc, and an optical disc reproducing apparatus for time-successively reproducing between a plurality of motion pictures is actualized.

Note that, in the embodiment described above, the picture data AN, BN and CN, composed of a plurality of motion pictures A, B and C, are recorded on an optical disc. However, the recording medium is not merely limited to this, but may be for example, a magnetic optical disc, a magnetic disc, or the like. In short, with various disc recording media, the same effects as the above described embodiment can be actualized.

While the above description has been in connection with the preferred embodiments of this invention, it will be obvious to those skilled in the art that various changes and modifications may be made. Therefore, covered in the appended claims are all such changes and modifications that fall within the true spirit and scope of the invention.

What is claimed is:

1. A method for recording motion picture data onto a spiral recording track of a disc recording medium, comprising the steps of:

dividing each of a plurality of groups of motion picture data into track units, each group of motion picture data representative of sequential motion, each track unit of each group of motion picture data contemporaneously corresponding to a track unit of each of the other groups of motion picture data; and separately and sequentially recording corresponding track units of each group of motion picture data onto the spiral recording track, such that each track unit is recorded along a length of the spiral recording track sufficient to overlap itself in the radial direction of the disc recording medium, wherein the overlapped portion of each track unit has a length corresponding to a time needed for a one-track-jump of an optical pick-up used for reproducing the motion picture data recorded on the spiral recording track.

2. A disc recording medium for recording motion picture data, comprising:

a disc suitable for recording motion picture data, the disc having a spiral recording track which defines a radial direction, wherein corresponding track units of each group of motion picture data are recorded onto the spiral recording track, such that each track unit is recorded along a length of the spiral recording track sufficient to overlap itself in the radial direction of the disc recording medium, the track units formed by dividing each of a plurality of groups of motion picture data into track units, each group of motion picture data representative of sequential motion, each track unit of each group of motion picture data contemporaneously corresponding to a track unit of each of the other groups of motion picture data, wherein the length of the overlapped portion of each track unit has a length corresponding to the time needed for a one-track-jump of an optical pick-up used for reproducing the motion picture data recorded on the spiral recording track.

3. A disc recording medium for recording motion picture data, comprising:

a disc suitable for recording motion picture data, the disc having a spiral recording track which defines a radial direction, wherein corresponding track units of each group of motion picture data are recorded onto the spiral recording track, such that each track unit is recorded along a length of the spiral recording track sufficient to overlap itself in the radial direction of the disc recording medium, the track units formed by dividing each of a plurality of groups of motion picture data into track units, each group of motion picture data representative of sequential motion, each track unit of each group of motion picture data contemporaneously corresponding to a track unit of each of the other groups of motion picture data, wherein the length of the overlapped portion of each track unit has a length corresponding to the time needed for a one-track-jump of an optical pick-up used for reproducing the motion picture data recorded on the spiral recording track, and wherein the disc recording medium is an optical disc.

4. A disc recording medium for recording motion picture data, comprising:

a disc suitable for recording motion picture data, the disc having a spiral recording track which defines a radial direction, wherein corresponding track units of each group of motion picture data are recorded onto the spiral recording track, such that each track unit is recorded along a length of the spiral recording track sufficient to overlap itself in the radial direction of the disc recording medium, the track units formed by dividing each of a plurality of groups of motion picture data into track units, each group of motion picture data representative of sequential motion, each track unit of each group of motion picture data contemporaneously corresponding to a track unit of each of the other groups of motion picture data, wherein the length of the overlapped portion of each track unit has a length corresponding to the time needed for a one-track-jump of an optical pick-up used for reproducing the motion picture data recorded on the spiral recording track, and wherein the corresponding track units of each group of motion picture data have a common time frame, and the corresponding track units of each group of motion picture data are successively recorded on the spiral recording track.

* * * * *